April 30, 1957 V. H. FRAY 2,790,188
METHOD OF AND APPARATUS FOR FORMING POLYGONAL ARTICLES
Filed April 15, 1954 2 Sheets-Sheet 1
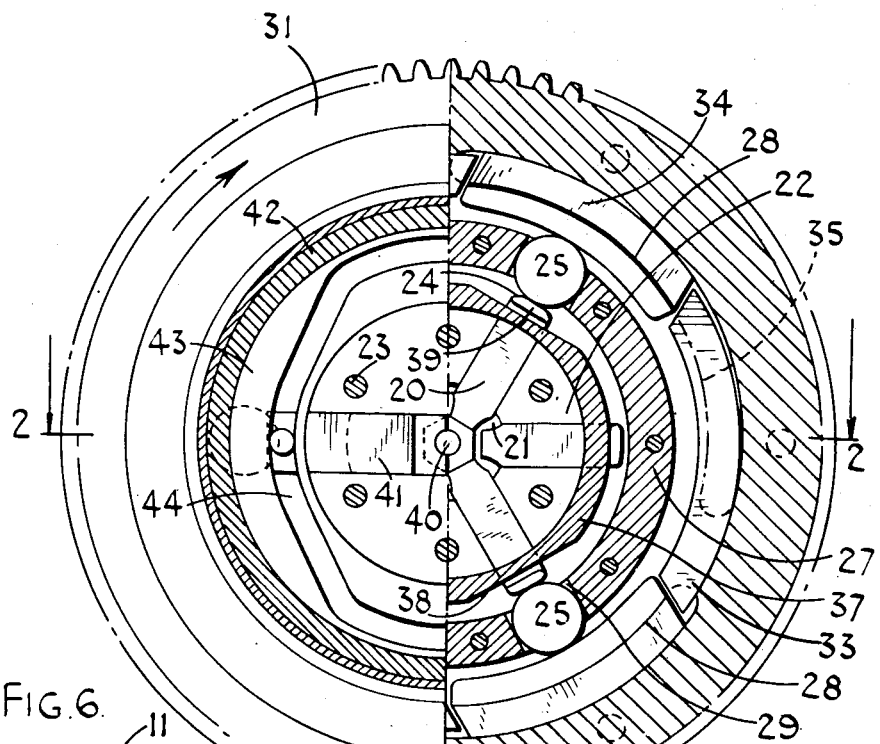
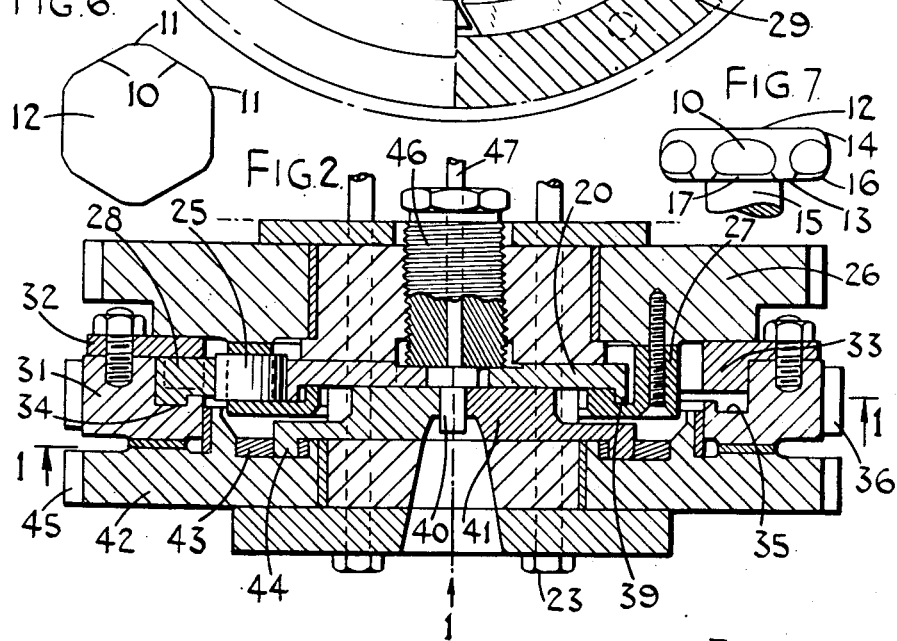
Inventor:
Victor Hill Fray
Watson, Cole, Grindle & Watson
Attys.

April 30, 1957 V. H. FRAY 2,790,188
METHOD OF AND APPARATUS FOR FORMING POLYGONAL ARTICLES
Filed April 15, 1954 2 Sheets-Sheet 2

Inventor:
Victor Hill Fray

Watson, Cole, Grindle & Watson
Attys.

United States Patent Office 2,790,188
Patented Apr. 30, 1957

2,790,188

METHOD OF AND APPARATUS FOR FORMING POLYGONAL ARTICLES

Victor Hill Fray, Auckland, Auckland, New Zealand

Application April 15, 1954, Serial No. 423,451

Claims priority, application New Zealand April 27, 1953

17 Claims. (Cl. 10—18)

This invention relates to a method of and apparatus for forming square, hexagonal and other polygonal shaped heads of bolt and like blanks under cold working conditions.

The present practice in the manufacture of, for example, a hexagonal headed bolt is to subject the blank to one or more upsetting operations in a cold forging machine so as to produce a head which corresponds roughly to the desired head and to thereafter subject the blank to a shearing or trimming operation so as to produce a head having sharp well-defined corners such as will enable a firm grip to be obtained thereon by a wrench.

This shearing or trimming operation, is however, objectionable in that it cuts away and wastes a certain amount of material which, although small for any single article, assumes fairly large proportions when a considerable number of articles are being made. Furthermore, with certain metals it is very difficult both to forge a blank to the requisite form and to trim the blank and it has become the practice to make headed articles of such metals by a machining operation which is, of course, extremely wasteful.

However, where the blank has been upset by one or more cold forging operations, it is necessary to subject it to this shearing or trimming operation as it is not practicable to obtain sufficiently sharp corners by forging alone, due to the difficulty of getting the metal to flow into corresponding corners of the die.

The object of the present invention is to provide an improved method of and apparatus for manufacturing such headed articles which will eliminate the wastage produced either by a trimming or a machining operation.

According therefore to one aspect of the present invention there is provided a method of making articles having polygonal shaped heads which comprises heading or forging a blank to a shape hereinafter referred to as the pre-formed shape, wherein the upset portion is of substantially the same configuration as the desired polygonal article but is of somewhat greater cross-sectional area and of somewhat less peripheral depth, and thereafter subjecting said pre-formed shape to lateral pressure by a plurality of dies adapted to perform two operations on said shape, said dies being so arranged that, during each said operation, there is at least one unconfined side face of said pre-formed shape between adjacent dies, said lateral pressure finishing said shape to the desired polygonal form.

Although, by making the pre-formed head of the blank to very accurate form, it is possible to obtain a perfectly finished head by the application of lateral pressure it is preferable to confine the end faces of the head, that is to say the underside and top of the head, during the application of lateral pressure so as to ensure that there is no unwanted axial flow of metal during the lateral pressing operation.

Where the finished polygonal article is to be of hexagonal form the pre-formed shape will include six flat surfaces spaced regularly around the periphery thereof these surfaces being converted into the flats on the hexagonal head during the lateral pressure operation.

Where six dies are used they may be operated in two sets of three or alternatively in three sets of two with the dies in each set operating on opposed surfaces of the blank.

Alternatively, a single set of two or three dies may be used with the blank being indexed between the operative strokes of the dies.

A further object of the present invention is the provision of apparatus for forming polygonal shaped heads on bolt and like blanks wherein there is provided blank holding means for receiving a blank from feed means, said blank holding means being adapted to support a blank so as to present the periphery of the head thereof in the path of movement of radially disposed die member, means being provided for opening and closing said die members so as to apply lateral pressure to the blank head to form the flats thereon, said means operating said dies in sets such that, when the dies are closed there is an unconfined peripheral portion of said head between adjacent dies.

Preferably the blank which is presented to the blank holding means from the feed means will be of pre-formed shape and in order that the pre-formed flat surfaces on the periphery of the head of this pre-formed shape are in correct register with the dies means are provided in association with the feed means through which the blanks are passed so as to ensure this correct register.

Further die means are conveniently provided for confining the end faces of the blank head during the opertion of the lateral die members.

Another object of the present invention is to provide apparatus for forming polygonal shaped heads on bolt and like blanks of pre-formed shape, comprising a die carrier, a blank receiving aperture in said carrier, a plurality of dies sliably mounted in said carrier and disposed radially of said aperture, the non-blank engaging ends of said dies projecting beyond the outer periphery of said carrier and means, rotatable around the outer periphery of said carrier, for engaging the projecting portions of said dies so as to close said dies in sets on to the periphery of the head of a blank so as to form the flats thereon, the arrangement being that there is always an unconfined peripheral portion of the blank head between adjacent dies of a set when a set is in its closed position, means being provided for opening the dies of a set when they have performed their operative stroke.

Preferably the end faces of the head of the blank are confined during the lateral pressing operation and the die member which engages the underside of the head may conveniently be constituted by the gripper members which grip the shank of the blank and hold it in its operative position in the aperture in the carrier member, the die member which engages the top face of the blank head being conveniently constituted by an adjustable plug member which can be adjusted in accordance with the desired thickness of the blank head and with which is associated an ejector pin.

The means for obtaining the closing of the laterally disposed die members may comprise an inner ring which is provided with a plurality of circumferentially spaced recesses each of which is adapted to have mounted therein a roller and an outer ring which is provided with a plurality of circumferentially spaced cam surfaces, means being provided for rotating these two rings and the arrangement being such that a set of die members will be closed on to the blank head when each die in the set is in alignment with a roller and with a cam surface.

In order to open the die members a cam ring is provided this cam ring being integral with the roller ring and being adapted to engage transversely extending flanges on the outer projecting ends of the lateral die members this cam ring being provided with a plurality of flats which are in alignment with the rollers in the roller ring.

The gripper members which engage the shank of the blank are actuated by a rotating cam track which comprises a disc having a cam groove formed in the one face thereof each gripper member being provided with a transverse pin or the like which is adapted to engage in the cam groove.

The roller receiving recesses in the roller ring may be of the same dimensions as the diameters of the rollers or, alternately, these recesses may be of elongated form and compression springs may be mounted in the recesses so as to urge the roller towards the trailing end of the recess.

The cam ring, roller ring and gripper actuating disc may each be provided around their periphery with gear teeth and the drive of these members may be a direct drive from gears mounted on or driven by a common driving shaft the relative speeds of rotation being such that during two consecutive rotations of the cam ring the head forming operation is carried out while during the next two consecutive rotations of the cam ring the finished blank is ejected and a fresh blank introduced.

Other and further objects, features and advantages will be apparent from the description which follows, read in connection with the accompanying drawings in which Figure 1 is a sectional plan view from underneath one form of machine, the view being taken along the line 1—1 of Figure 2;

Figure 2 is a sectional side elevation taken on the line 2—2 of Figure 1;

Figures 6 and 7 are plan view and side elevation, respectively, showing the pre-formed shape of the bolt head.

Figure 3:
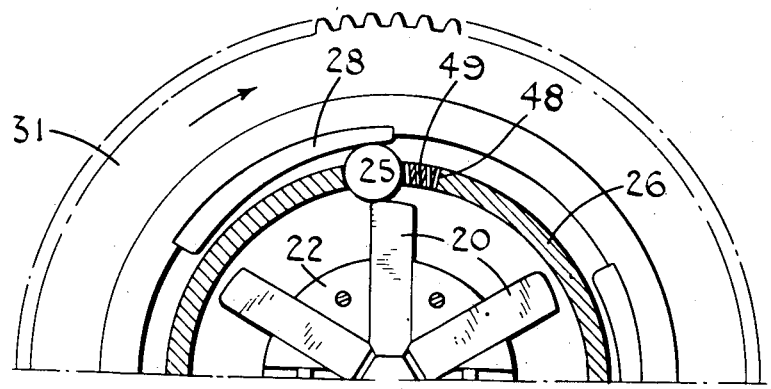
Figures 3 and 4 are diagrammatic views showing two stages in the closing of a die member with an alternative form of apparatus.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

One method of carrying out the invention as applied to the manufacturer of a bolt having a head of hexagonal shape will now be described in detail.

The bolt is made of cylindrical stock and the blank which is cut off from the length of stock is subjected to two or more heading operations, the first of which forms, in the conventional manner, a preliminary head on the blank this preliminary head being of substantially conical form.

The second heading operation upsets the blank still further to produce the pre-formed head or shape shown in Figures 6 and 7 whose configuration is as follows: The periphery of this pre-formed head includes six flat surfaces 10 which correspond in position to the flats which are to be formed on the finished head, these flat surfaces being, therefore, spaced regularly around the central axis of the blank and adjacent flat surfaces 10 being joined by round corner portions 11. The upper face 12 of the pre-formed head may be of slightly domed shape with the center of this upper surface 12 the same distance above the under surface 13 of the head measured in an axial direction as the full required depth in the finished head, and the upper peripheral edge 14 of the pre-formed head being chamfered. The underside 13 of the pre-formed head may also be of slightly domed shape from its junction with the shank portion 15, and those parts of the lower peripheral edge 16 of the pre-formed head which are adjacent to the flat surfaces 10 may also be chamfered as shown at 17. This pre-formed head can readily be formed during the second heading operation by the use of suitably shaped tools since the corners are round and relatively broad so that the metal flows readily to take up this desired pre-formed shape.

The blank is next submitted to the finishing or side forging operation where the flat surfaces of the pre-formed head are engaged by dies which close laterally on to the pre-formed head, that is to say, in a direction which is normal to the central longitudinal axis of the blank. Preferably, six such dies are employed each die having a width, measured transversely of the direction of travel of the die which is substantially greater than the length of a finished flat on the head of the bolt and having a depth which is greater than the required depth for the finished head. These six side forging dies are preferably arranged to operate in two sets of three, the second set being arranged to close on the blank after the first set has performed its operative stroke, the arrangement being such that the dies in each set operate on alternate flat surfaces on the pre-formed head so that there is an unconfined side of the head between any two dies when they are in their closed or operative position.

During this side forging operation the upper and lower faces of the pre-formed head are preferably confined so as to provide flat end faces on the finished head. However, when either set of dies is operating, due to the unconfined side of the blank between any two dies, metal may flow to this unconfined side. The provision of an unconfined side between any two dies when they are in their operative position is most important for not only does this enable the side forging operation to be carried out under less pressure than would be the case, for example, if all six dies were operating simultanesously but it also enables the metal to flow into this unconfined side and this materially assists in the prevention of ripple forming on the upper and lower faces of the pre-formed head as might occur if, for example, all six dies were operated simultaneously.

Furthermore, by operating first one set of dies and then another, one is enabled to form flats on the blank with the first set of dies which are of somewhat greater length than the length of a finished flat but which are of the same depth as a finished flat. In other words, when the dies of the first set have performed their operative stroke the distance between adjacent corners of adjacent finished flats formed as a result of this first operation is somewhat less than the length of the flats which are to be provided on the finished head. Due to the work hardening of the flats formed by the first set of side forging tools the second set of tools have a tendency to force the excess metal on the corners of the first set of flats to flow axially of the blank with the result that the metal flows towards the upper or lower faces of the blank and thus fills up the corners.

Although it is preferred when making a hexagonally headed bolt to use two sets of dies operating in sequence three pairs of dies may be used in which case the dies of each pair would operate on opposed flat surfaces of the preformed head so that there would be two unconfined sides between the pairs of dies.

As a further alternative a single set of three dies or a single pair of dies may be used with the blank being indexed between each closing operation of the set or pair of dies.

One form of apparatus for carrying out the final head forming stage will now be described in detail with reference to Figures 1 and 2 of the accompanying drawings, it being appreciated that the actual apparatus for forming the pre-formed shape described above is itself well known as it is merely a normal type heading machine with a particular shaped die.

As shown from Figure 2, the apparatus has its axis disposed vertically and has six flat forming hammers or dies 20 (in the case of hexagon heads to be formed) disposed radially around a central space or hole 21 with these dies 20 carried in guides integral with a carrier member 22 which is rigidly secured to the base of the machine by bolts or the like 23.

As is clearly shown in Figure 1, the dies 20 having rounded outer ends 24, which project beyond the carrier 22 and which are adapted for engagement by rollers 25 which will transmit inward hammer-like movements to the dies.

Mounted for rotary movement around the carrier 22 there is a roller carrying ring 26, this ring 26 having secured thereto a rim 27 which extends around the outer ends 24 of the dies 20 and which carries three freely rotatable rollers 25 spaced at equal circumferential distances apart around same, these rollers 25 being adapted at times to engage not only the outer ends 24 of the dies 20, but to also engage the internal faces of swaging cams 28. The rollers 25 are freely mounted in slots 29 in the rim 27 of the roller ring 26 so that they can effect movement in a radial direction, they being larger in diameter than the thickness of the rim 27.

The roller carrying ring 26 is rotated around the carrier 22 by having teeth 30 formed in the portion of its periphery which is clear of the roller rim 27, such teeth 30 being engaged by the teeth of a gear wheel (not shown) which is mounted on a shaft and receives suitable power drive.

The swaging cams 28 are each mounted on the internal annular faces of a cam ring 31 the cam 28 being actually mounted in elongated slots formed between an annular groove on the cam ring 31 and a locating plate 32 which is secured to the cam ring 31 in any suitable manner. This locating plate 32 is provided with three inwardly projecting flanges 33 which are of substantially the same length as the cams 28 so that, disposed around the internal annular face of the cam ring 31 are three swaging cams 28 and three projecting flanges 33 of the locating plate 32. Each cam 28 is provided on one side face thereof with a flange 34 which is adapted to sit in an annular groove 35 formed in the cam ring 31.

Each cam 28 is of substantially arcuate form and, there being three such cams and three projections 33 each cam 28 will extend over substantially 60° of arc. Each groove 35 in the cam ring 31 is slightly eccentric with respect to the cam ring and the locating plate 32 can be adjusted around the cam ring 31 so as to vary the position of the cams 28 with respect to the cam ring 31 and by virtue of the eccentricity of the grooves 35 this enables the radial position of the cams 28 to be adjusted.

The cam ring 31 is also provided around its outer peripheral with suitable gear teeth 36 which are adapted to mesh with a suitable gear wheel mounted on the same driving shaft as the gear wheel which drives the roller ring 26.

The operation of the machine will be more fully described hereinafter, but it will be obvious that when a die 20, a roller 25 and cam 28 are in radial alignment the die 20 will be forced inwardly so as to operate upon the work. In order to permit the withdrawal or opening of a die member 20 after it has been moved inwardly on to the work and after a roller 25 has passed the rounded end 24 of the die 20 a cam-shaped ejector ring 37 is provided, this ejector ring 37 conveniently being formed integrally with the rim 27 of the roller ring 26. This ejector ring 37 is provided with flats 38 at positions which correspond to the positions of the rollers 25 in the rim 27 and each die 20 is provided on its outer end with a transversely projecting flange 39 which can be engaged by this ejector ring 37. When a roller 25 is in engagement with the end 24 of a die 20 a flat 38 on the ejector ring 37 will be disposed below the flange 39 of the die so that the die 20 can move inwardly. As the roller carrying rim 27 is rotated so as to carry the roller 25 past the die 20 so the ejector ring 37 rotates and the flange 39 of the die 20 is engaged by the ejector ring so that the die 20 is moved outwardly away from the work.

To hold the blank 40 in its operative position in the central aperture 21 there are provided a pair of vise jaws 41 each of which is provided on its inner end face with a hemispherical slot whereby, when the two jaws 41 are in their operative or closed position the shank of the blank 40 is gripped between the jaws 41. These jaws or gripper members 41 are slidably mounted in suitable guides formed in the carrier 22 and the opening and closing of these jaws 41 is effected by means of a rotating gripper actuating ring 42 which is provided with a cam track 43 having a cam groove 44 therein, each jaw 41 being provided with a transversely projecting finger or like member 44 which engages in this groove 43. This gripper actuating ring 42 is also provided on its outer periphery with suitable gear teeth 45 whereby it may be driven from a suitable gear wheel actuated by the common driving shaft which is used to drive the roller ring 26 and the cam ring 31.

As clearly seen from Figure 2, the upper side faces of the two gripper members or jaws 41 engage the underside of the head of the blank 40 when the jaws are in their operative position and these jaws 41 thus form an end die for confining the underside of the head of the blank during the forming operation. In order to confine the top face of the head of the blank 40 during the head forming operation a plug member 46 is mounted in the carrier 22, this plug member 46 being provided with a flat end face which is adapted to abut against the top face of the head of the blank when the blank is held between the jaws 41. Conveniently, this plug member 46 is screwed into a tapped hole formed in the carrier 22 so that its axial position can be adjusted thus permitting the apparatus to be set up so that blanks having heads of different thicknesses can be operated upon.

Associated with this plug member 46 is an ejector rod 47 which is centrally and slidably mounted in the plug member 46 the end face of this ejector rod 47 forming part of the end die face for confining the top face of the blank head. Suitable conventional means are provided for actuating the ejector rod these means being, of course, synchronized with the operation of the blank gripper jaws 41.

The operation of this form of machine will now be described in detail. Considering the position when a fresh blank is first inserted into the central aperture 21 three swaging cams 28 will be in a position when their trailing edges are just about to contact a roller 25 with each roller 25 just about to contact the end 24 of a die 20. With three rollers 25 and three cams 28 the six dies 20 are operated in two sets of three.

The speeds of rotation of the various members which are given hereafter are, of course, to be regarded purely as examples they having been selected for a machine which will give an output of 75 finished bolts per minute. Other speeds may, of course, be used for differing outputs, but the speeds must be in the same ratio as those given hereafter.

The cam ring 31, roller ring 26 and the gripper actuating ring 42 are rotated in the same direction and with the cam ring rotating at 275 R. P. M. the roller ring will rotate at 300 R. P. M. and the gripper actuating ring at 37½ R. P. M.

With the parts in the position indicated above as the cam ring and roller ring rotate so each roller 25 will be forced downwardly by the cam 28 and will thus drive the die member 20 which it is contacting inwardly. Thus, the first set of three dies are actuated. As soon as each roller 25 has moved past the die member 20, this die member will be moved outwardly by the ejector ring 37 and the roller ring and cam ring continue to rotate bringing the roller and cam in radial alignment with the next three dies 20 so that the second set of dies is actuated in a similar manner. During one complete revolution of the roller ring each die member will be actuated three times due to the fact that there are three rollers. At the end of the first revolution of the roller ring 26 the parts will occupy the position shown in the right-hand side of Figure 1, that is to say, the roller is now approximately midway along the working face of each cam 28. This position is obtained by virtue of the fact that the relative speeds of rotation of the cam ring to the roller ring are in the ratio of 11 to 12 so that for each revolution of the roller ring the cam ring, in effect, lags 30° on the roller ring. During the next complete revolution of the roller ring the same conditions obtained as during the first revolution, that is to say, each die member 20 is actuated three times and in order to ensure that the requisite force is applied during each of the blows of the dies the cam members are so mounted that the roller is forced slightly further in as it progressively approaches the leading edge of the cam. This is necessary, of course, as the "across flat" dimensions of the bolt head is being reduced with each blow delivered by the dies.

At the end of this second revolution of the roller ring the position will be that the roller ring has gained another 30° on the cam ring so that each roller will just be leaving contact with the leading face of its associated swaging cam. For the next two revolutions of the roller ring the cams will not engage the rollers as each roller will be passing through the gap between adjacent cams or, in other words, will be passing by the projecting flanges 33 on the locating plates 32 which is associated with the cam ring 31. During this time the rollers will, under the action of centrifugal force, move outwardly so that they will not engage the projecting ends of the hammers.

During revolutions 3 and 4, therefore, of the roller ring a blank can be ejected from the machine and a fresh blank inserted.

From a consideration of the left-hand side of Figure 1 it will be seen that to move the gripper members 41 from a closed to an open position it is necessary for the gripper actuating ring 42 to move through 90°. This opening and closing movement of the grippers 41 must only take place every two revolutions of the roller ring so that for one revolution of the roller ring and gripper actuating member can move through 45° so that the ratio of the speeds of the roller ring to the gripper actuating ring must be 8 to 1.

Figure 4:
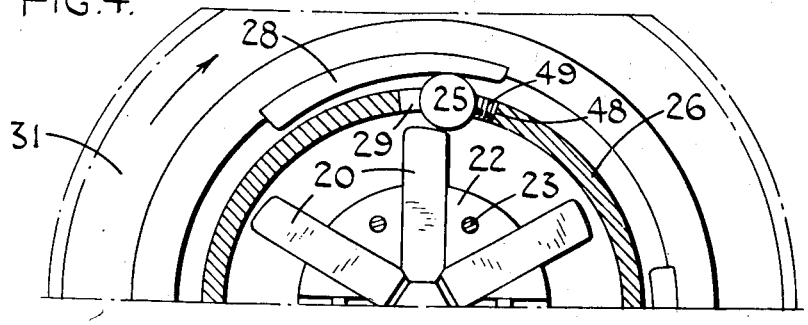
Figure 5:
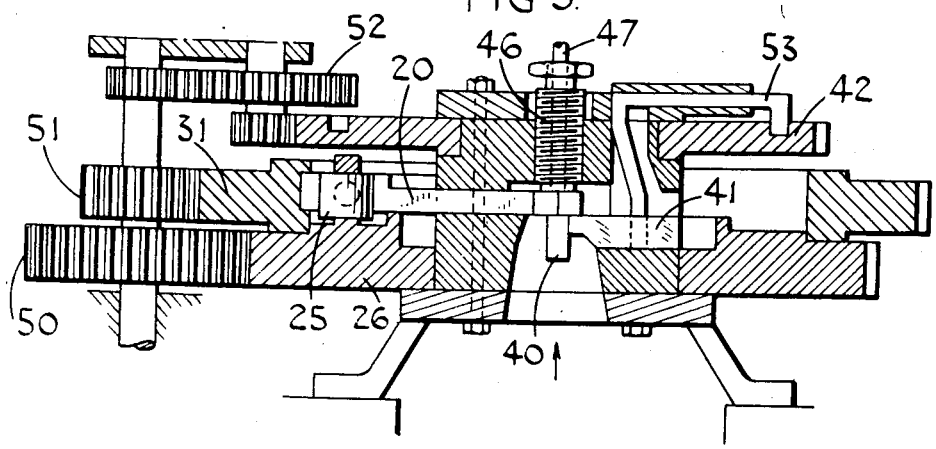
Figure 5 is a sectional side elevation of this alternative form of apparatus.

In the modified form of the machine shown somewhat diametrically in Figures 3, 4 and 5 of the accompanying drawings like parts have been given the same reference numerals as the parts shown in Figures 1 and 2. This modified form of machine has been developed so as to reduce the friction incurred when the rollers, cams and dies are in alignment and to reduce the side thrust on the dies. In this modified construction the recesses 29 in the rim of the roller ring are in the form of elongated slots and there is disposed between each roller 25 and the leading edge 48 of each slot a compression spring 49 which thus holds the roller 25 against the trailing edge of the slot under normal conditions.

As before, three rollers 25 are provided and three swaging cams 28, but in this case the cams 28 taper in the opposite direction to those described previously, that is to say, the trailing end of each cam 28 is somewhat thicker than is the leading end.

The operation of this modified form of the machine is substantially identical with that described above, but the speeds of rotation are somewhat different. For the same output from the machine as before the roller ring will rotate at 240 R. P. M. while the cam ring will rotate at 700 R. P. M. In other words, as compared with the machine shown in Figures 1 and 2, the ratio between the speeds of rotation of the roller ring and cam ring is altered from 12 to 11 to 1 to 2$^{11}/_{12}$. With such a machine and with the provision of the elongated roller slots and the compression springs when the roller is passing the projecting end of a die, and is being engaged by a cam due to the greater speed of the cam as compared with that of the roller ring the roller will be rotated about its own axis as it passes over the end of the die. Such an action will collapse the compression spring 49 as is shown in Figure 4 and this rolling action of the individual rollers considerably lessens the friction between the three parts and also eliminates the side thrust which was previously present on the dies.

As soon as the roller has left the end of a die, it will be free to move back against the trailing edge of its associated slot under the influence of the compression spring.

With the ratio of speeds as set out above, six blows will be delivered by each die during the course of two revolutions of the roller ring and during the course of the next two revolutions ejection and feeding of a new blank can take place as the cams will only pass the rollers when these are in the gap between adjacent dies.

The actuation of the gripper members will be the same as before although, as seen from Figure 5, the gripper actuating ring 42 is in a different relative position in the machine for ease of driving and each gripper is actuated through the medium of an L-shaped rod 53. The gripper actuating ring must still be rotated at one-eighth of the speed of rotation of the roller ring so that with the roller ring rotating at 240 R. P. M. the gripper actuating ring rotates at 30 R. P. M.

Figure 5 shows the arrangement for driving the various rings, the roller ring 26 being driven by a gear wheel 50, the cam ring 31 by a gear wheel 51 and the gripper actuating ring 42 by a suitable train of rotation gears indicated generally at 52.

The feed mechanism for feeding the blanks into the machine may be of any suitable type and one convenient feed mechanism may be as follows.

From the heading machine in which the blanks have been formed to their pre-formed shape they are fed down a suitable chute with their shanks disposed vertically and with the heads uppermost. From this chute the blanks would be engaged by suitable transfer finger mechanism which would carry the blanks by their shank ends and push the blanks into the central aperture in the carrier of the machine. In order to ensure that the pre-formed flats on the blanks will register with the ends of the die members the blanks may be passed, by the transfer fingers, through some suitable gauging mechanism which will, if necessary, effect rotation of the blanks in the transfer fingers to obtain this correct registration. Such gauging means may conveniently comprise a pair of spaced and contra-rotating discs these discs being spaced apart by a distance equal to the "across flat" width of the pre-formed head of the blank.

With soft metals it may not be necessary to make the blanks of the pre-formed shape described above as the flats can be formed by the lateral moving dies without undue strain on the machine.

The manufacture of a bolt by the method and machines described above eliminates entirely the necessity for any final trimming of the bolt head and thus saves a considerable amount of material and also enables a wider range of materials to be used for bolts made by this method and apparatus than has heretofore been possible with the conventional heading and trimming operation. The resultant bolt head has extremely sharp corners and has flats which are not marked or scarred in any way as some times occurs with a trimming operation.

Although the method has been described in relation to a hexagonal headed bolt it will, of course, be appreciated it is equally applicable to a square or to an octagonally headed bolt or even to a bolt which is provided with two flat faces and two curved faces, and is equally applicable to polygonal shaped articles such as nuts, though in the case of nuts where it is the practice to forge the nut so that it is provided on its upper and lower faces with central depressions it would be necessary to provide some form of mandrel for engaging in these depressions during the side forging operation so that the depressions retain their circular shape whereby they can readily be engaged by piercing and tapping tools.

Having thus described the invention, what is claimed as new and desired to be secured by Letters Patent is:

1. A method of making articles having polygonal shaped heads which comprises heading or forging a blank to pre-formed shape, wherein the upset portion is of somewhat greater cross-sectional area and of somewhat less peripheral depth than the head of the desired finished article, axially confining the head of the preformed shape between a pair of head end forming dies, and subjecting said pre-formed shape to lateral pressure by a plurality of dies adapted to perform two operations on said shape, said dies being so arranged that, during each said operation there is at least one unconfined side face of said shape between adjacent dies, said lateral pressure finishing said shape to the desired polygonal form.

2. A method according to claim 1 of forming articles having a head of hexagonal form wherein six dies are used, said dies being operated in two sets of three.

3. A method according to claim 1 of forming articles having a head of hexagonal form wherein six dies are used, said dies being operated in three sets of two with the dies in each set operating on opposite sides of the pre-formed shape.

4. A method according to claim 1 of forming articles having a head of hexagonal form wherein a single set of not more than three dies is used, the blank being indexed between the operative strokes of the dies.

5. Apparatus for forming polygonal shaped heads on bolt and like blanks comprising blank holding means for receiving a blank from feed means, a plurality of radially disposed radially movable die members, said blank holding means being adapted to support a blank so as to present the periphery of the head thereof in the path of movement of said radially disposed die members, means for opening and closing said die members so as to apply lateral pressure to the blank head to form the flats thereon, said means operating said dies in sets such that, when the dies are closed, there is an unconfined peripheral portion of said head between adjacent dies, and further die means for confining the end faces of the blank head during the operation of said radially movable die members.

6. Apparatus for forming polygonal shaped heads on bolt and like blanks of pre-formed shape comprising a die carrier, a blank receiving aperture in said carrier, a plurality of dies slidably mounted in said carrier and disposed radially of said aperture, the non-blank engaging ends of said dies projecting beyond the outer periphery of said carrier, further die means for confining the end faces of the blank head during the operation of said plurality of dies mounted in said carrier and means rotatable around the outer periphery of said carrier and adapted to engage the projecting portions of said dies so as to close said dies in sets onto the periphery of the head of a blank so as to form the flats thereon, the arrangement being that there is always an unconfined peripheral portion of the blank head between adjacent dies of a set when a set is in its closed position, and means for opening the dies of a set when they have performed their operative stroke.

7. Apparatus according to claim 6 wherein the further die means is constituted by a pair of gripper members adapted to grip the shank of a blank so as to hold it in its operative position in said aperture said gripper members also abutting the underside of the head of the blank.

8. Apparatus according to claim 7 wherein the gripper members are slidably mounted in the carrier, means being provided for closing said gripper members onto the shank of a blank after it has been fed into the aperture and for opening said gripper members, so as to permit ejection of the blank, after the head forming operation has been performed.

9. Apparatus according to claim 6 wherein the die means which engages the top face of the blank head is adjustable in a direction axially of the blank.

10. Apparatus according to claim 9 wherein an ejector pin is slidably mounted in said end die.

11. Apparatus according to claim 8 wherein the rotatable means for engaging the projecting die ends comprises an inner rotatable ring having a plurality of rollers mounted therein in spaced circumferential relationship and an outer rotatable ring having a plurality of circumferentially spaced cam surfaces adapted to engage said rollers so as to force said dies inwards when a die, roller and cam surface are in alignment.

12. Apparatus according to claim 11 wherein the means for opening the dies comprises a cam ring rotatable with the roller ring and adapted to engage a transverse flange on the projecting end of each die member, said cam ring being provided with a plurality of flats at spaced circumferential points corresponding to the positions of said rollers.

13. Apparatus according to claim 11 wherein the cams are mounted in grooves in the cam ring whereby the relative position of the cams with respect to the ring may be adjusted.

14. Apparatus according to claim 11 wherein the means for opening and closing the gripper die members comprises a cam groove formed in a rotatable gripper actuating ring each gripper member being provided with a transverse pin adapted to engage in said cam groove.

15. Apparatus as claimed in claim 14 wherein the relative speeds of rotation of the cam ring, roller ring and gripper actuating ring are such that during two consecutive rotations of the cam ring the head forming operation takes place whilst, during the next two consecutive rotations of the cam ring, the laterally disposed die members are at rest and the finished die ejected and a fresh blank fed into the blank receiving aperture.

16. Apparatus according to claim 15 wherein the cam ring, roller ring and gripper actuating ring are each provided with gear teeth whereby they may be rotated by suitable gear wheels mounted on or driven from a common driving shaft.

17. Apparatus according to claim 11 wherein each roller is mounted in an elongated circumferentially extending slot in the roller ring, a compression spring being disposed between each roller and that end of the slot which is in advance of the roller in the direction of rotation of the roller ring.

References Cited in the file of this patent

UNITED STATES PATENTS

| | | |
|---|---|---|
| 141,711 | Hall | Aug. 12, 1873 |
| 1,480,077 | Johnson | Jan. 8, 1924 |
| 1,858,733 | Flachbart | May 17, 1932 |
| 1,861,186 | Littell | May 31, 1932 |
| 1,876,174 | Stoler | Sept. 6, 1932 |
| 2,024,593 | Moore | Dec. 17, 1935 |